United States Patent
Ash et al.

[15] 3,699,482

[45] Oct. 17, 1972

[54] SURFACE WAVEGUIDING IN CERAMICS BY SELECTIVE POLING

[72] Inventors: Eric A. Ash, London; Samuel C.-C. Tseng, Ossining, both of N.Y.

[73] Assignee: International Business Machines Corporation, Armonk, N.Y.

[22] Filed: June 30, 1971

[21] Appl. No.: 158,179

[52] U.S. Cl. ....................333/30, 317/234, 330/5.5, 333/72, 29/25.35, 29/25.41

[51] Int. Cl. ............................H03h 7/36, H03h 9/30

[58] Field of Search ....333/30, 72; 330/5.5; 250/211; 343/17.2, 173.2; 310/9.7

[56] References Cited

UNITED STATES PATENTS

| | | | |
|---|---|---|---|
| 3,289,114 | 11/1966 | Rowen | 333/30 |
| 3,388,334 | 6/1968 | Adler | 330/5.5 |
| 3,626,334 | 12/1971 | Keyes | 333/30 |

*Primary Examiner*—Herman Karl Saalbach
*Assistant Examiner*—C. Baraff
*Attorney*—Victor Siber et al.

[57] ABSTRACT

A surface waveguide structure and method of making same. A substrate material consisting either of a piezoelectric ceramic or ferroelectric crystal, is selectively poled by an electric field so as to form an elastic surface wave channel within the substrate structure. The electric field applied cross the substrate causes a polarization of the crystalline structure in those areas influenced by the electric field and has a negligible effect in those areas not exposed to the electric field. The free surface wave velocity is substantially increased in the polarized areas of the substrate and remains unchanged in the unpolarized regions. Poling of the substrate is accomplished by applying an electric field across a pair of electrodes which cover the upper and lower surfaces of the substrate except for a narrow region between the transmitting and receiving surface wave transducers.

The process for manufacturing the surface waveguide structure is applicable to both acoustic and optical surface waveguiding devices. Also, the polarization of the substrate may be selectively altered by subsequent application of electric fields across the body of the substrate to make switchable waveguide regions.

10 Claims, 11 Drawing Figures

INVENTORS
ERIC A. ASH
SAMUEL C.-C. TSENG

BY Victor Siber
AGENT

SURFACE WAVEGUIDING IN CERAMICS BY SELECTIVE POLING

BACKGROUND OF THE INVENTION

The present invention relates to a surface waveguide structure and the process for making same. More particularly, to a surface waveguide device which has its elastic wave supporting medium selectively polarized by an electric field so as to in certain areas delineate a narrow region having a low wave propagation velocity, thus providing a surface wave channel guide.

The existence of surface waves in a semi-infinite isotropic solid has been known since the investigation of wave propagation in solids conducted by Lord Rayleigh, as published in his paper entitled "On Waves Propagated Along the Plane Surface of an Elastic Solid," *Proceedings London Mathematical Society*, Vol. 17, pages 4–11, Nov. 1885. For a long period of time, the study of surface waves continued to be pursued in the seismographic arts, because of its usefulness in understanding the composition of earth structures.

Recently, with the development of planar processing techniques for the manufacture of integrated circuits, a great deal of interest in surface elastic waves has been revived. New developments in integrated circuit technology now permit the fabrication of transducers, waveguiding structures, and other elements needed to study, control and utilize surface elastic waves. A very thorough presentation of the development of surface wave phenomena and technology from the time of Rayleigh to the present state of the art is published in the following article: "Surface Elastic Waves" by Richard M. White, *Proceedings of the IEEE*, Vol. 58, No. 8, August 1970, pp. 1238–1276.

Solid state wave device technology has been investigated considerably in the prior art. In a device of this type, the uniform elastic wave supporting medium is utilized as a substrate for a pair of transducers. In operation, the transmitting transducer launches an elastic surface wave which propagates through the medium as a composite of a shear and longitudinal waves. This elastic wave impinges upon the receiving transducer which converts the elastic wave into an electrical signal at the output. Illustrative background literature references concerning surface wave devices are the following:

1. "The Generation and Propagation of Acoustic Surface Waves at Microwave Frequencies," P. H. Carr, *IEEE Transactions on Microwave Theory and Techniques*, Vol. MTT-17, No. 11, November 1969, pp. 845–855.
2. "Direct Piezoelectric Coupling to Surface Elastic Waves," R. M. White et al., *Applied Physics Letters*, Vol. 7 pp. 314–316, December 1965.
3. "Propagation of Piezoelectric and Elastic Surface Waves on the Basal Plane of Hexagonal Piezoelectric Crystals," C.-C. Tseng et al., *Journal of Applied Physics*, Vol. 38, pp. 4,274–4,280, October 1967.
4. "Microsound Components, Circuits and Applications," E. Stern, *IEEE Transactions on Microwave Theory and Techniques*, Vol. MTT-17, No. 11, November 1969.
5. "Lenses and Grated Films for Focusing and Guiding Acoustic Surface Waves," T. Van Duzer, *Proceedings of the IEEE*, Vol. 58, No. 8, pp. 1,230–1,237, August 1970.
6. "Microsound Surface Waveguides," E. A. Ash et al., *IEEE Transactions on Microwave Theory and Techniques*, Vol. MTT-17, No. 11, pp. 882–892, November 1969.

At the current state of technology, several techniques are known for guiding an elastic surface wave along a prescribed path on the surface of a substrate structure that acts as a good elastic wave transmitting medium. All of these techniques may be grouped according to two basic guidance principles which are: 1) confining waves in a channel having more or less parallel reflecting walls, and 2) creating by various means a path along the transmitting medium for which the phase velocity of surface waves is lower than in the surrounding medium. For example, the various classes and types of guiding structures are shown on pages 1,262–1,264 of the White article cited above. While these devices provide some solutions to the problem of guiding surface waves through a solid, several problems still remain. Specifically, the ridge or channel type of guide structure is difficult and costly to manufacture because of the precise geometries required. Also, with respect to the strip type of devices, deposition of a uniform layer or strip onto the substrate medium is difficult to achieve. The resulting imperfections from the manufacturing process cause some loss to be experienced in the transmission of the elastic surface wave through the substrate medium. Another problem existing with the strip type of device is that the strip is subject to physical damage in handling, such as scratches, cuts, etc., which could impair their function.

OBJECTS OF THE INVENTION

Therefore, it is an object of this invention to provide a surface waveguide structure capable of guiding an elastic surface wave along the surface of a medium without the requirement of topographic or strip guiding.

It is another object of the present invention to provide a surface waveguide structure that is simple to manufacture.

It is another object of the present invention to provide a surface waveguide structure that is economical to manufacture and is not easily susceptible to physical damage in handling.

It is another object of the present invention to provide a process for making surface waveguide structures by selectively polarizing any piezoelectric ceramic or ferroelectric crystal.

SUMMARY OF THE INVENTION

In accordance with this invention, an elastic surface waveguiding structure is provided for channeling information signals from an input interdigital transducer to an output transducer by means of a channeled region which is formed in a substrate medium by the presence of unpolarized crystals (a non piezoelectric region) that are surrounded by polarized crystals (a piezoelectric region). The channel, through which information in the form of surface waves is transmitted, consists of a narrow strip of unpolarized substrate material within the main body of the substrate structure, and this strip connects the transmitting and receiving transducers. The substrate material exists with its crystalographic structure having a uniform polarization everywhere except within the strip line region where the polarization of the crystalographic structure is random. Within this strip region, the polarizations of particles of the ceramic are rather randomly oriented and macroscopically the overall polarization is zero. Thus, in this region, the elastic constants are not stiffened by the piezoelectric effect which arises from polarization. Thus, the phase velocity within this channeled strip region is less than in the polarized medium where the elastic constants are stiffened by polarization, thereby causing the surface wave to travel along a prescribed low velocity path.

The surface waveguide structure is manufactured using either a piezoelectric ceramic substrate such as lead-titanate zirconate (PZT) or a ferroelectric crystal such as gadolinium molybdate $Gd_2(MoO_4)_3$, according to the following process 1. Form a substrate base structure.
2. Deposit a metallic electrode layer over the upper surface of the base structure and a similar electrode layer over the bottom surface of the base substrate.
3. Remove a small strip region in the upper electrode metallic layer between locations where transmitting and receiving transducers are to be located.
4. Apply a poling potential at the electrode terminals so as to create an electric field between the two metallic electrode layers.
5. Mask out patterns on the upper electrode for a transmitting and a receiving transducer at locations separated by the small strip region.
6. Remove both the upper and bottom electrode metallic layers from the substrate leaving transducer metal patterns on the upper surface of the base substrate.

This process for making a surface waveguide device is applicable to both acoustic and optical waveguide structures. Furthermore, the principles of the invention may be readily adapted to manufacture various types of surface waveguide devices such as directional couplers, switchable elements, power dividers, resonators, and other elastic wave circuit devices.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
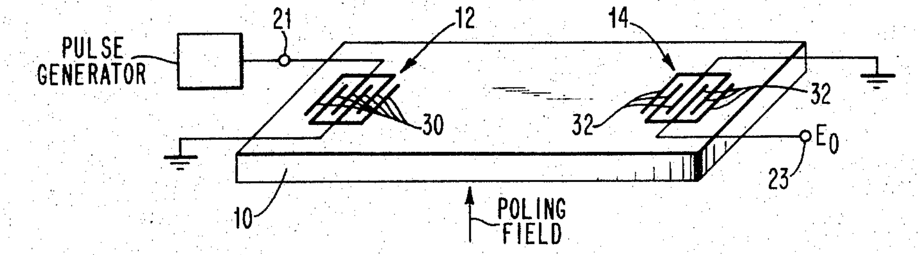
FIG. 1 is a graphical illustration of an elastic wave substrate medium having a transmitting and receiving wave transducer positioned on the surface thereof.

Referring now to FIG. 1, there is shown a surface wave device comprising an elastic wave propagating medium disposed between a pair of transducers, said device being in a state prior to the formation of a guide region within the propagating medium. The device consists of a substrate region 10, a transmitting interdigital transducer 12 and a receiving interdigital transducer 14. Substrate region 10 which acts as a medium for a traveling Rayleigh wave or elastic surface wave is formed from any piezoelectric ceramic such as lead-titanate zirconate (PZT), or ferroelectric crystal such as gadolinium molybdate $Gd_2(MoO_4)_3$. Further examples of ferroelectric materials are found in U.S. Pat. application Ser. No. 27,111, filed Apr. 9, 1970, now U.S. Pat. No. 3640865.

In order to achieve transmission of surface wave information that is launched from transducer 12 to transducer 14, it is necessary to provide some means to guide the wave energy through the medium or substrate 10. This means for guiding consists of a narrow channel region between said transducers 12 and 14 which region possesses the property of having a lower phase velocity relative to the phase velocity of the medium. Thus, as is well known in the surface wave technology art, the substantial portion of the wave energy which is launched from transducer 12 is bounded within the lower phase velocity region so as to effectively guide the wave energy to the receiving transducer 14.

Figure 2:
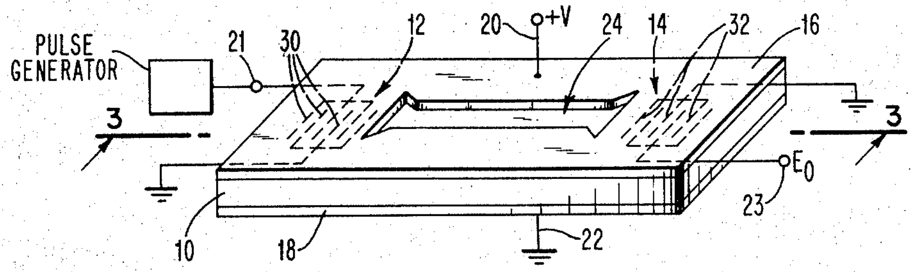
FIG. 2 is a graphical illustration of the device of FIG. 1 after the placement of electrode metallic layers on the upper and lower surfaces thereof.

The definition of the narrow channel region between transducers 12 and 14 is accomplished by means of a selected electric field poling process which is implemented by the structure shown in FIG. 2. Substrate region 10 is sandwiched between two electrode plates 16 and 18. These electrode plates may be deposited onto the substrate by any well known deposition technique known to those skilled in the integrated circuit technology art. As a result of the deposition step, the entire waveguide device is sandwiched between two conductive metallic strips 16 and 18. These strips 16 and 18 have terminal connections 20 and 22 and form the basic structure by which electric field polarization across the waveguide device is achieved.

For the purpose of illustration, the transducers are shown in the figure as dotted lines to indicate the location where they would be formed after the poling step by etching the electrode layer and leaving the metal fingers of the transducers. For example, in FIG. 2, strip region 24 is disposed between the locations of transducers 12 and 14. The metal fingers 30 and 32 are formed from the metallic electrode 16 by any known technique such as exposure of a photoresist material through a photo mask having the pattern of the transducers. Then, the metal electrode 16 is etched away except for those areas delineated by the photo mask.

As indicated previously, it is necessary to define a narrow strip channel guide region wherein the phase velocity of elastic wave propagation is less than the phase velocity throughout the remaining portion of the substrate. Accordingly, a narrow region 24 is delineated within the top metallic electrode region 16 by means of a photo-etching process. It should be recognized by those skilled in the art, that any other technique which would accomplish the removal of the desired portion of the electrode could also be utilized.

After having constructed the device as shown in FIG. 2, an electric potential +V is applied to terminal 20. The potential required to generate a sufficient electrical field so as to polarize a substrate material is dependent on the type of substrate medium used. For example, if the choice of medium is PZT, then it is sufficient to apply a potential +V that will result in approximately 80 volts per mil of thickness. The electric field which is generated across the substrate polarizes the crystal structure of the substrate 10, thus making the material elastically stiffened by the piezoelectric effect which in turn causes the phase velocity of the substrate medium to be increased relative to the phase velocity of the substrate in a non-polarized state. This can be observed by the following equation:

$$v = \sqrt{c(1+K^2)/\rho} \quad ; \quad K^2 = e^2/c\epsilon$$

where $v$ is phase velocity, $\rho$ is the density of the medium, $c$ is the effective elastic constant, and $K^2$ is the effective electromechanical coupling constant derived from the piezoelectric constant $e$, the dielectric constant $\epsilon$ and the elastic constant $c$. Since the $K^2$ term exists only for the polarized region, it is clear that the phase velocity $v$ increases as the medium is polarized.

In the preferred embodiment, a piezoelectric material known as PZT is utilized as the substrate region 10. It should be recognized that selection of the substrate material is a matter of choice and the principles of this invention are not limited to the specific materials disclosed. In order to polarize the PZT material, a heat environment is applied to substrate during the application of an electric potential to the terminal 20. The heat environment of approximately 120°C during the selective poling step is sufficient to permit polarization within a reasonable time. This temperature is not critical and there exists a large temperature range which can be used depending on the substrate material chosen. Furthermore, with certain materials such as some ferroelectric crystals, it is not necessary to apply any heat during the poling step. For example, $Gd_2(MoO_4)_3$ requires no heat to effect polarization.

The presence of an electric field of approximately 80 volts/mil across the substrate 10 is continued for a period of time until the material cools to room temperature (approximately 23°C), that is, if heat was needed to achieve the polarization of the crystals. If no heat was necessary, then the field can be applied for a shorter duration of time. For example, $Gd_2(MoO_4)_3$ may be polarized in less than 100 nanoseconds, thus enabling this material to be used in the manufacture of a switchable device, as will be discussed further in this specification.

Figure 3:
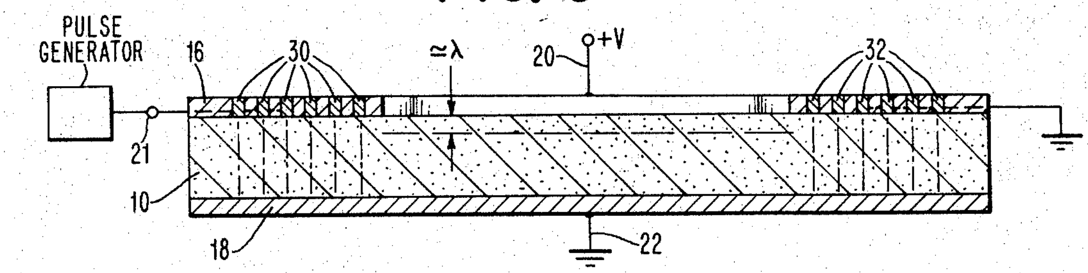
FIG. 3 is a cross-sectional drawing of the device shown in FIG. 2.

After the substrate material has been selectively poled, the electrode metallic layers 16 and 18 are removed from the waveguide device except for transducers 12 and 14 by any well known etching process such as those disclosed in U.S. Pat. Nos. 3,505,135, issued Apr. 7, 1970 and 3,401,068 issued Sept. 10, 1968. The resulting poled device contains a crystalline structure that is polarized to enhance the phase velocity of surface waves throughout the material except within a very narrow strip region 24 connecting the transducers 12 and 14. Within this region 24 which remains unpolarized, the phase velocity of surface waves remains unchanged and relatively slower than in the areas outside of the unpoled region. Thus, surface waves may be launched by exciting the transducer fingers 30 of the transmitting element on substrate 10 and the surface wave having a wavelength of λ causes particles at the surface of the substrate 10 to move in direction of propagation of the wave and normal to it with a depth of λ, as shown in FIG. 3. This movement of particles constitutes the propagation of the surface wave or Rayleigh wave which is then sensed by fingers 32 of the receiving transducer 14.

The input and output of surface wave information is accomplished by applying electrical pulse signals at terminal 21 and sensing electrical changes caused by the vibration of the piezoelectric material under the fingers 32 as impressed onto the lines feeding terminal 23 to constitute an output electrical signal Eo.

Figure 4:
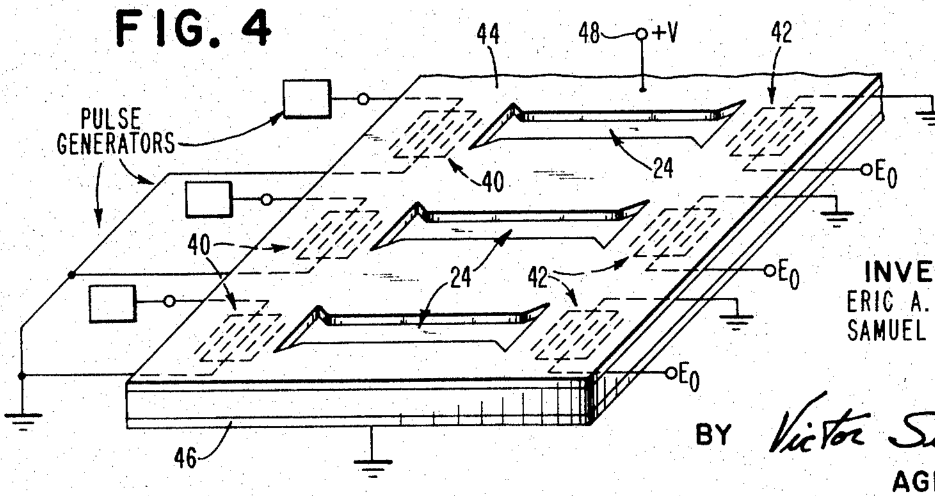
FIG. 4 is a graphical illustration of a plurality of waveguide regions formed on a single substrate.

Referring now to FIG. 4, there is shown a plurality of waveguide devices structured within a single substrate region. Each of the channel regions 24 is used to guide either an acoustic or optical surface wave from the plurality of transmitting transducers 40 to their respective receiving transducers 42. Similar to the single channel guide device, electrode metallic layers 44 and 46 are superimposed over the waveguide devices. The channel regions are defined by the application of an electrical potential at terminal 44 sufficient to polarize the substrate when the electric field is impressed across the substrate region 10.

As indicated in the description of the single channel guide device discussed above, the electrode metallic layers 44 and 46 may be removed from the upper and lower surfaces of substrate 10 after the selective poling step is completed. Also, heat may be applied during the poling step to speed up polarization, as needed depending on the specific material chosen for the substrate 10. Then by removal of the electrode metallic layers, a waveguide device is formed which has no surface material present other than the transmitting and receiving transducers. Guiding is achieved purely by means of the internal difference in polarization within the substrate.

It should be recognized by those skilled in the art, that while the specific embodiments disclosed herein show relatively few or single waveguiding elements, that in practice a large scale circuit chip structure could contain several hundred channel guides within the single chip. Furthermore, it is very desirable to make use of manufacturing steps which are compatible with those practiced in making large scale integrated circuitry.

It should be recognized by those skilled in the art that there are several variations of the disclosed process which may be utilized to manufacture a waveguide structure in accordance with the principles described herein. For example, it is possible to first deposit the transducer devices on the substrate medium prior to the deposition of the metallic electrode layers. However, the surface layer must then be restricted to cover an area less than the entire substrate surface so as to not interfere with the transducers and may then be selectively removed without removal of the metal fingers of the transmitting and receiving transducers. Another possible variation, would be to begin with a completely polarized substrate medium. Then, instead of a selective polarizing step, the narrow strip region would be selectively unpolarized to form the channel guide as required.

EXTENSIONS OF THE INVENTION

While the waveguide structure disclosed with respect to the preferred embodiment relates to a permanent waveguide device, the principles of the invention may also be utilized in switchable waveguide devices. This switching capability is accomplished by not removing the electrode layers from the substrate body and providing means for selectively energizing one or more electrodes which cause an electric field to be impressed on the crystalline structure of the substrate. Since in certain ferroelectric crystals such as $Gd_2(MoO_4)_3$ the polarization of the particles within the substrate region is not permanent, and may be erased or switched in orientation by the application of an electric field, a great number of geometrical guiding arrangements are possible by means of a plurality of electrode regions which establish various potential gradients.

Figure 5:
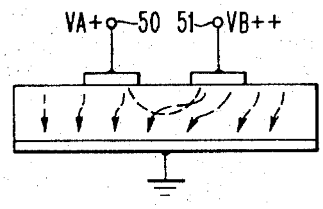
FIGS. 5 and 6 are cross-sectional drawings showing a switchable waveguide device in the switching state and in the erase state, respectively.
Figure 6:
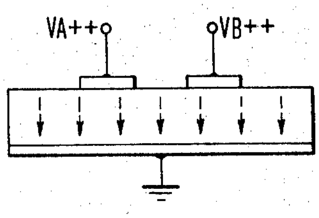

FIG. 5 shows the cross-section of a basic surface waveguide device which may be used for either acoustic or optic surface waves and which is capable of being selectively polarized by applying potentials VA and VB at terminals 50 and 51, respectively. When a voltage differential is applied between terminals 51 and 52, the differential being VA+, VB++, a 90° switching of polarization occurs across the substrate 10 as shown in FIG. 5. This provides a substantially higher effective index of refraction (lower phase velocity) in the switched region for light polarized essentially perpendicular to the surface. After having formed the waveguide, the channels may be effectively erased by applying a uniform potential across terminals 51 and 52. This is shown as a uniform field across the substrate 10 in FIG. 6.

Ferroelectric mediums suitable for switching of polarization are ferroelectric ceramics such as those of the lead zirconate-lead titanate type (e.g., $Pb_{.97}La_{.02}Zr_{.65}Ti_{.35}O_3$). These examples are to be considered exemplary and manufacture of the disclosed devices is not limited to such.

Figure 7:
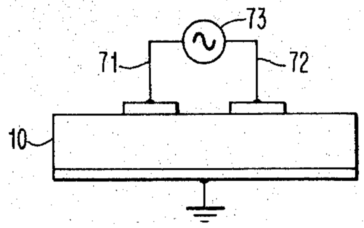
FIG. 7 is a cross-sectional drawing showing a waveguide device which is phase modulated.

Another application of the present invention may be found in the manufacture of a phase modulation device as shown in FIG. 7. There, electrodes 71 and 72 are energized with a varying voltage from source 73. This varying voltage causes a varying electric field and in turn, a modulating polarization of wave information travelling across the surface of substrate 10.

Figure 8:
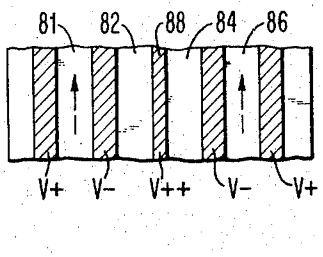
FIGS. 8, 9 10 and 11 are illustrations of surface wave directional couplers built according to the principles of the invention.

Further applications of the present invention are shown in FIGS. 8, 9, 10 and 11, which demonstrate application of the principles disclosed herein in directional coupling devices. FIG. 8 presents a leaky waveguide directional coupler. The region between waveguides 81 and 82 is given an effective index of refraction greater than the index of refraction in waveguides 81 and 82 by applying a voltage V++ on the center electrode 88. By application of this voltage, leaky wave coupling is accomplished between waveguides 81 and 82.

Figure 9:
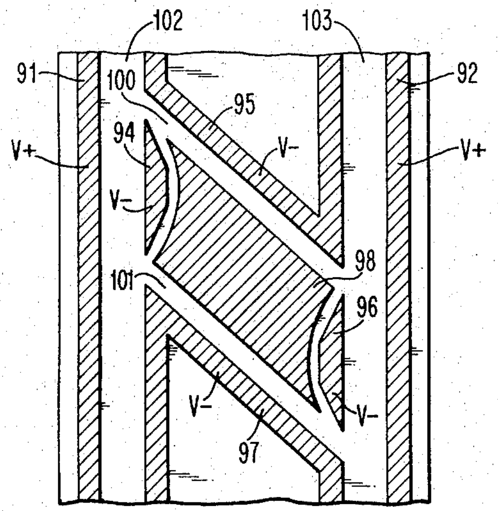
Figure 10:
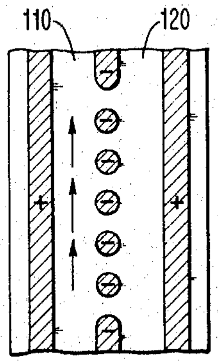
Figure 11:
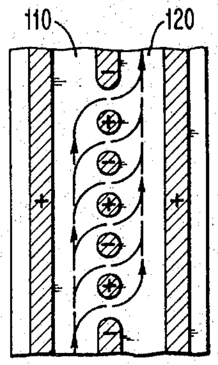

FIGS. 9, 10 and 11 demonstrate the application of the principles of the invention to switchable branch line directional coupling devices. In the structure of FIG. 9, a potential of V+ is applied to electrode 91 and 92, and a potential of V− is applied to electrodes 94, 95, 96 and 97. Then, if a V− potential is applied to electrode 98, waveguides 100 and 101 are not coupled. However, if a V+ potential is applied to electrode 98, waveguides 100 and 101 are formed and part of the surface waves propagating downward in waveguide 102 will be switched via channels 100 and 101 into waveguide 103.

Other types of directional couplers are shown in FIGS. 10 and 11. In these devices, voltages are applied to the various segments separating the two channels 110 and 120. Surface waves propagate along the waveguides 110 and 120 as indicated by the arrows in the FIGS. The surface (acoustic or optical) wave energy may be switched from channel 110 to channel 120 by applying the potentials shown in FIG. 11, to alternate regions of the separation electrodes.

The above examples are merely illustrative of applications of the principles of this invention. These are but a small number of the possible embodiments and numerous and varied other arrangements can be readily devised in accordance with the principles of the invention.

We claim:

1. A surface waveguide device comprising:
   - a substrate material capable of supporting an elastic surface wave;
   - input transducer means positioned on said substrate for receiving an electrical input pulse train and in response thereto launch an elastic surface wave on the surface of said substrate;
   - output transducer means positioned on said substrate for receiving said surface wave and converting the wave energy to an electrical pulse;
   - said input and output transducer means being positioned opposite each other and separated by a finite distance over which said surface wave travels;
   - said substrate having two regions;
   - a first region being polarized to an orientation that increases the phase velocity of surface waves;
   - and a second narrow guide region which is unpolarized and forms a connecting path between said input and output transducers.

2. The device specified in claim 1 wherein said substrate is a piezoelectric ceramic material.

3. The device as specified in claim 2 wherein said piezoelectric material is PZT.

4. The device as specified in claim 1 wherein said substrate is a ferroelectric crystal.

5. The device as specified in claim 1 wherein said input and output transducers are interdigital transducers.

6. The device as specified in claim 1 wherein said polarized region of said substrate is a piezoelectrically stiffened elastic material.

7. A method for making a surface waveguide device comprising the steps of:
   - preparing a substrate material capable of supporting elastic wave energy for further deposition steps;
   - depositing upper and lower electrode layers on the upper and lower surface of said substrate;
   - removing a narrow region from the upper electrode layer so as to expose a narrow guide channel between said input and output transducers;
   - applying a potential differential between said upper and lower electrode layers for a sufficient length of time to polarize those areas in the substrate that are sandwiched between the two electrodes.

8. The method as defined in claim 7 further comprising the steps of:

selectively removing said upper electrode layer so as to form an input and output transducer on said substrate;

removing said lower electrode layer.

9. The process as defined in claims 7 further comprising the steps of:

applying a heat environment to said substrate prior to the application of a potential differential between said electrode layers; and continuing the application of voltage gradient until said substrate cools to room temperature.

10. The method as defined in claim 9 wherein said potential differential is applied for a time sufficient to polarize said substrate material.

* * * * *